US006847465B1

(12) United States Patent
Wetchler et al.

(10) Patent No.: US 6,847,465 B1
(45) Date of Patent: Jan. 25, 2005

(54) DYNAMIC INK-JET PRINT MODE ADJUSTMENT

(75) Inventors: David M. Wetchler, Vancouver, WA (US); James M. Brenner, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/528,202

(22) Filed: Mar. 17, 2000

(51) Int. Cl.[7] .............................................. G06F 15/00
(52) U.S. Cl. .................... 358/1.13; 358/1.1; 358/1.2
(58) Field of Search ................................. 358/1.13, 1.1, 358/1.15, 1.16, 1.2

(56) References Cited

U.S. PATENT DOCUMENTS

| | | | |
|---|---|---|---|
| 5,262,797 A | | 11/1993 | Boeller et al. ............... 346/1.1 |
| 5,471,313 A | * | 11/1995 | Thieret et al. .............. 358/296 |
| 5,583,547 A | * | 12/1996 | Gast et al. .................... 347/22 |
| 5,663,750 A | * | 9/1997 | Sakuma .......................... 347/7 |
| 5,907,331 A | | 5/1999 | Markham ..................... 347/12 |
| 5,926,185 A | * | 7/1999 | Vyncke et al. .............. 345/619 |
| 5,929,875 A | | 7/1999 | Su et al. ........................ 347/19 |
| 5,943,068 A | * | 8/1999 | Ono et al. ...................... 347/3 |
| 5,971,582 A | * | 10/1999 | Fuji ............................. 700/90 |
| 6,050,666 A | * | 4/2000 | Yeoh et al. .................... 347/16 |
| 6,275,600 B1 | * | 8/2001 | Banker et al. .............. 382/112 |
| 6,390,617 B1 | * | 5/2002 | Iwao .......................... 347/102 |
| 6,618,159 B1 | * | 9/2003 | Tobita et al. ............... 358/1.13 |

FOREIGN PATENT DOCUMENTS

| | | | |
|---|---|---|---|
| EP | 0665 677 | | 8/1995 |
| EP | 0863 004 | | 9/1998 |
| JP | 05208488 | * | 8/1996 ........... B41F/33/14 |
| JP | 11191049 | * | 7/1999 ............. G06F/3/12 |
| WO | WO 99/02348 | | 1/1999 |

OTHER PUBLICATIONS

European Patent Office Search Report, dated Jul. 23, 200.

* cited by examiner

*Primary Examiner*—Mark Wallerson

(57) ABSTRACT

The present invention uses various real-time monitoring and resultant data inputs to change the print mode, dynamically during print cycles. Note that as a result of real-time monitoring and print mode adjustment, predetermined primary default print modes can be set a higher performance level. Various feedback subsystems provide real-time information critical to selecting specific print mode operational parameters, or "Operational Attributes." The attributes allow the print mode to be fine tuned, dynamically, for each printer and pen combination over the life of the printer. Thresholds that signal a print mode change are defined.

11 Claims, 4 Drawing Sheets

TABLE 2
OPERATIONAL ATTRIBUTES

| 10-POINT SCALE | 1 | 2 | 3 | 4 | 5 | 6 | 7 | 8 |
|---|---|---|---|---|---|---|---|---|
| 0 | 5+ | ±2.0 | 5+ | 5+ | ±2.0 | ±2.0 | 10% | POOR |
| 1 |  | ±1.8 |  |  | ±1.8 | ±1.8 | 9% |  |
| 2 | 4 | ±1.6 | 4 | 4 | ±1.6 | ±1.6 | 8% |  |
| 3 |  | ±1.4 |  |  | ±1.4 | ±1.4 | 7% |  |
| 4 | 3 | ±1.2 | 3 | 3 | ±1.2 | ±1.2 | 6% |  |
| 5 |  | ±1.00 |  |  | ±1.00 | ±1.00 | 5% | MODERATE |
| 6 | 2 | ±0.8 | 2 | (2) | ±0.8 | ±0.8 | 4% |  |
| 7 |  | ±0.6 |  |  | ±0.6 | ±0.6 | 3% |  |
| 8 | (1) | ±0.4 | 1 | 1 | (±0.4) | ±0.4 | 2% | (GOOD) |
| 9 |  | (±0.2) |  |  | ±0.2 | ±0.2 | 1% |  |
| 10 | 0 | 0 | (0) | 0 |  |  | 0% |  |
| PERFORMANCE SCORE ON 10-POINT SCALE | 8 | 9 | 10 | 6 | 8 | 5 | 5 | 10 |
| SUBJECTIVE WEIGHTING | 100 | 100 | 60 | 25 | 50 | 25 | 50 | 25 |
| WEIGHTED SCORE | 8 | 9 | 10 | 9 | 9 | 8.75 | 7.5 | 10 |
| TOTAL WEIGHTED SCORE | 8.9 | | | | | | | |

FIG.3

TABLE 1

| OPERATIONAL ATTRIBUTE | PRINT DEFECT |
|---|---|
| 1. NOZZLE(S) OUT | Streaking |
| 2. LINE FEED ADVANCE ACCURACY | Light/dark lines |
| 3. MISDIRECTED NOZZLES VARIATION | Light/dark lines |
| 4. WEAK NOZZLES | Streaking |
| 5. ALIGNMENT | Staggered lines and granularity |
| 6. THETA-Z | Staggered lines and banding |
| 7. DROP WEIGHT | Overall darkness/lightness, Not enough saturation, too much ink in page |
| 8. DOT SHAPE ON PAGE | Dark/light regions, fuzzy lines |
| X AXIS ALIGNMENT PRIMARY TO PRIMARY | Banding and increased granularity and edge roughness |
| Y AXIS ALIGNMENT PRIMARY TO PRIMARY | Banding and streaking |
| COLUMN TO COLUMN INTRA-PRIMARY ALIGNMENT | Increased granularity and edge roughness |
| BI DIRECTIONAL ALIGNMENT | Increased granularity and edge roughness |
| PEN TO PAPER SPACING (MEDIA THICKNESS) | Banding |
| PEN TO PAPER ANGLE | Banding |
| PEN TO PAPER VARIATION OVER PRINT ZONE | Banding variations over zone |
| PEN AXIS NOZZLE DIRECTIONALITY | Streaking and banding |
| SCAN AXIS NOZZLE DIRECTIONALITY | Banding and increased granularity and edge roughness |
| PEN THERMAL RESPONSE | Overall darkness/lightness, not enough saturation, too much ink in page, hue shift |
| AMBIENT TEMPERATURE AND HUMIDITY | Dry time |
| AMBIENT TEMPERATURE ALONE | Pen thermal response |
| DROP VELOCITY | Streaking, fuzzy lines, banding |
| INK LEVEL | Streaking |

FIG.4

DYNAMIC INK-JET PRINT MODE ADJUSTMENT

BACKGROUND OF THE INVENTION

1. Field of the Invention

The present invention relates generally to ink-jet printing and, more specifically to a method and apparatus for dynamic print mode adjustment.

2. Description of Related Art

The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal*, Vol. 36, No. 5 (May 1985), Vol. 39, No. 4 (August 1988), Vol. 39, No. 5 (October 1988), Vol. 43, No. 4 (August 1992) Vol. 43, No. 6 (December 1992) and Vol. 45, No.1 (February 1994) editions. Ink-jet devices are also described by W. J. Lloyd and H. T. Taub in *Output Hardcopy* [sic] *Devices*, chapter 13 (Ed. R. C. Durbeck and S. Sherr, Academic Press, San Diego, 1988).

FIG. 1 (PRIOR ART) depicts an ink-jet hard copy apparatus, in this exemplary embodiment a computer peripheral printer 101. For convenience in describing the art and the present invention, all types of ink-jet hard copy apparatus are sometimes hereinafter referred to as "printers;" all types, sizes, and compositions of print media are also referred to as "paper;" all compositions of colorants are sometimes referred to as "ink;" and all embodiments of an ink-jet writing instruments are simply referred to as a "pen;" no limitation on the scope of the invention is intended nor should any be implied.

A housing 103 encloses the electrical and mechanical operating mechanisms of the printer 101. Operation is administrated by an electronic controller (usually a microprocessor or application specific integrated circuit ("ASIC") controlled printed circuit board) 102 connected by appropriate cabling to a computer (not shown). It is well known to program and execute imaging, printing, print media handling, control functions and logic with firmware or software instructions for conventional or general purpose microprocessors or with ASIC's. Cut-sheet print media 105, loaded by the end-user onto an input tray 120, is fed by a suitable paper-path transport mechanism (not shown) to an internal printing station, or "print zone," 107 where graphical images or alphanumeric text are rendered onto adjacently positioned paper. A carriage 109, mounted on a slider 111, scans the print zone 107 (stationary paper wide ink-jet writing instruments are also known in the art and may be employed with the present invention). An encoder 113 subsystem is provided for keeping track of the position of the carriage 109 at any given time. A set of individual ink-jet pens, or print cartridges, 115X are mounted in the carriage 109. Reusable printhead systems are fluidically coupled by tubing 119 to replaceable or refillable ink reservoirs 117X (generally, in a full color system, inks for the subtractive primary colors, cyan (X=C), yellow (X=Y), magenta (M) and true black (X=K) are provided; ink fixer (X=F) solutions are also sometimes provided). Once a printed page is completed, the print medium is ejected onto an output tray 121. As indicated by the labeled arrows, the scanning axis is referred to as the "x-axis," the paper transport path as the "y-axis," and the printhead firing direction as the "z-axis."

In essence, the ink-jet printing process involves digitized dot-matrix manipulation of drops of ink ejected from a pen onto an adjacent sheet of paper. One or more ink-jet type writing instruments includes a "printhead," consisting generally of drop generator mechanisms and a number of columns of ink drop firing nozzles. Each column, or color-defined, selected subset of nozzles (referred to in the art as a "primitive"), selectively fires ink droplets (typically each being only a few picoliters in liquid volume) that are used to create a predetermined print matrix of dots on the adjacently positioned paper as the pen is scanned across the media. A given nozzle of the printhead is used to address a given matrix column print position on the paper (referred to as a picture element, or "pixel"). Horizontal positions, matrix pixel rows, on the paper are addressed by repeatedly firing a given nozzle at matrix row print positions as the pen is scanned. Thus, a single sweep scan of the pen across the paper can print a swath of tens of thousands of dots. The paper is stepped to permit a series of contiguous swaths. Complex digital dot matrix manipulation is used to form alphanumeric characters, graphical images, and even photographic reproductions from the ink drops. Stationary, page-wide, ink-jet printheads are also contemplated and are adaptable to the present invention.

The computerized printing processes employed with dot matrix manipulation are often referred to simply as "print modes." Print modes and resultant printer operations are generally chosen and fixed for any given setting of print media selection and print quality (e.g., an end-user computer application selection of "special media" and "photo quality," or the like as would be known in the art). Assignee's pending patent application, U.S. Ser. No. 09/181951, by J. M. Brenner et al., discloses changes to printer behavior based on what the user has done.

As a writing system degrades over its product life, whether from age or use, print quality can also degenerate. Based on product life, a fixed, predetermined, print mode is chosen during development of a product for each media/print quality setting available to the end user. Usually each print mode is set based on a worst case operational scenario (maximum mechanical tolerance variations, pen variations, media variations, and the like parameters as would be known to those skilled in the art). By using a worst case scenario, print quality does not fall below an acceptable predetermined level based on empirical product development data. One-pass per print swath, bidirectional printing, is the fastest scanning type print mode. However, it is very sensitive to missing or misdirected nozzles, paper skew, and the like. A common solution is to use slower print modes to improve print quality (e.g., multi-pass swath printing and the like). Thus, throughput is slower than competing products such as laser printers.

Some exemplary print defects and customary causes are:

| Operation Attribute | Print Defect |
| --- | --- |
| NOZZLE(S) OUT | Streaking |
| LINE FEED ADVANCE ERRORS | Light/dark lines |
| MISDIRECTED NOZZLES | Light/dark lines |
| WEAK NOZZLES | Streaking |
| PRINTHEAD MISALIGNMENTS | Staggered lines and granularity |
| THETA-Z (PRINTHEAD SKEW) | Staggered lines and banding |
| DROP WEIGHT VARIATION | Overall dark/light variations, insufficient saturation, or ink bleed through |
| DOT SHAPE/SIZE VARIATION | Dark/light regions, fuzzy lines |

FIG. 4 is TABLE 1, providing more complete listing of Operational Attributes and related Print Defects; the foregoing list of eight of these Attribute/Defect pairs will be used as an exemplary set for describing the present invention.

A variety of means for recognizing such print defects are known in the art. For example, Lesniak in U.S. Pat. No. 5,387,976 discloses a METHOD AND SYSTEM FOR MEASURING DROP-VOLUME IN INK-JET PRINTERS, issued Feb. 7, 1995; optical sensing techniques and the use of test patterns have long be used, such as a MONITORING AND CONTROLLING QUALITY OF PEN MARKINGS ON PLOTTING MEDIA, U.S. Pat. No. 5,262,797 filed by Boeller et al. on Apr. 4, 1990 (each assigned to the common assignee herein and incorporated herein by reference).

An ink-jet printer including the present invention would employ one or more of such defect detection subsystems in order to obtain real-time information regarding current printing conditions. While familiarity with such means is helpful, it is not essential to an understanding of the present invention.

Generally, however, a printer is capable of much higher performance assuming optimum operational conditions. Thus, some of this degradation may be compensated if the writing system can self-determine the actual cause of the degradation. Therefore, there is a need for print mode control based upon real-time feedback regarding status of various components within the ink-jet writing system.

SUMMARY OF THE INVENTION

In its basic aspects, the present invention provides a method for determining a print quality capability indicator of an ink-jet hard copy apparatus based on current actual operational conditions of the apparatus. The method includes the steps of: storing a w plurality of predetermined ink-jet printing operation attributes related to output print quality; monitoring a plurality of ink-jet printing operating characteristics in real time, wherein said operating characteristics are correlated to said attributes; correlatively comparing said operating characteristics to said attributes; based on said step of correlatively comparing, deriving a comparison function for each of the operating characteristics; and assigning a valuation, parameter based on the comparison function for each of the operating characteristics such that said valuation parameter is the print quality capability indicator representative of current actual operational conditions.

In another basic aspect, the present invention provides a computerized method for selecting a print mode for an ink-jet hard copy apparatus, including the steps of: storing a set of data indicative of ink-jet printing Operational Attributes related to output print quality; monitoring print quality related ink-jet printing characteristics during printing operations; comparing each of said characteristics to selected Operational Attributes and deriving a comparison value for each of said characteristics indicative of current operational functionality of the apparatus; calculating a value function representative of expected print quality during a next subsequent printing operation as a function of all derived comparison values for each of said characteristics; comparing said value function to a correlated preselected print quality value indicative of a predetermined print quality output; and selecting the print mode for the next subsequent printing operation based on said comparing said value function to said correlated preselected print quality value indicative of a predetermined print quality output.

In another basic aspect, the present invention provides a method for selecting a print mode for an ink-jet hard copy apparatus having a plurality of user selected print modes for rendering a plurality of print quality levels, including the steps of: A) storing a set of ink-jet printing Operational Attributes; B) monitoring print quality related ink-jet printing characteristics during printing operations; C) comparing said characteristics to said Operational Attributes for deriving a comparison value representative of expected print quality during a next subsequent printing operation; D) assigning a currently available print mode to said predetermined value; E) comparing said currently available print mode to a user currently selected print mode; and F) over-riding said currently selected print mode by selecting said currently available print mode when said currently selected print mode is insufficient to render an expected print quality level from the currently selected print mode of the plurality of user selected print modes.

In another basic aspect, the present invention provides a system for dynamic print mode selection in an ink-jet hard copy apparatus having a plurality of end-user selectable print quality levels, including: sensor means for real-time monitoring of print quality related ink-jet printing characteristics; coupled to said sensor means, memory means for storing data output from said sensor means and for containing predetermined print mode operational instructions related to print quality; and processing means for encoding the data output from said sensor means as a value representative of current operational print quality availability and for comparing current operational print quality availability to desired print quality based on a currently selected one of the end-user selectable print quality levels and for overriding the current end-user selectable print quality level for the next printing operation and substituting a print mode representative of achieving the current end-user selectable print quality level from said predetermined print quality related ink-jet printing characteristics print quality related ink-jet printing characteristics mode operational instructions when said current operational print quality availability is not adequate to meet the print quality level of the current end-user selectable print quality level.

Some of the advantage of the present invention are:

it provides real-time, automatic adjustment of print mode, ensuring that a predetermined minimum print quality can be maintained;

it permits the use of higher performance print modes as primary operational parameters;

it is automatic, requiring no end-user intervention for implementation;

it provides more consistent print quality in each available printer operational setting; and it permits the use as single pass, bidirectional swath printing as a primary print mode.

The foregoing summary and list of advantages is not intended by the inventors to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprize the public, and more especially those interested in the particular art to which the invention relates, of the nature of the invention in order to be of assistance in aiding ready understanding of the patent in future searches. Other objects, features and advantages of the present invention will become apparent upon consideration of the following explanation and the accompanying drawings, in which like reference designations represent like features throughout the drawings.

BRIEF DESCRIPTION OF THE DRAWINGS

FIG. 3 is TABLE 2, an exemplary rating chart for print quality determination and print mode adjustment for the device as shown in FIG. 2.

FIG. 4 is TABLE 1, setting out a list of ink-jet printing Operational Attributes and related Print Defects.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

The present invention provides a system for weighting and normalizing data to evaluate the potential print quality a hard copy apparatus is currently capable of producing. Various attributes are combined in such a way that threshold values can be created and various print modes attached to those threshold values. Dynamic print mode selection is then implemented.

Figure 1:
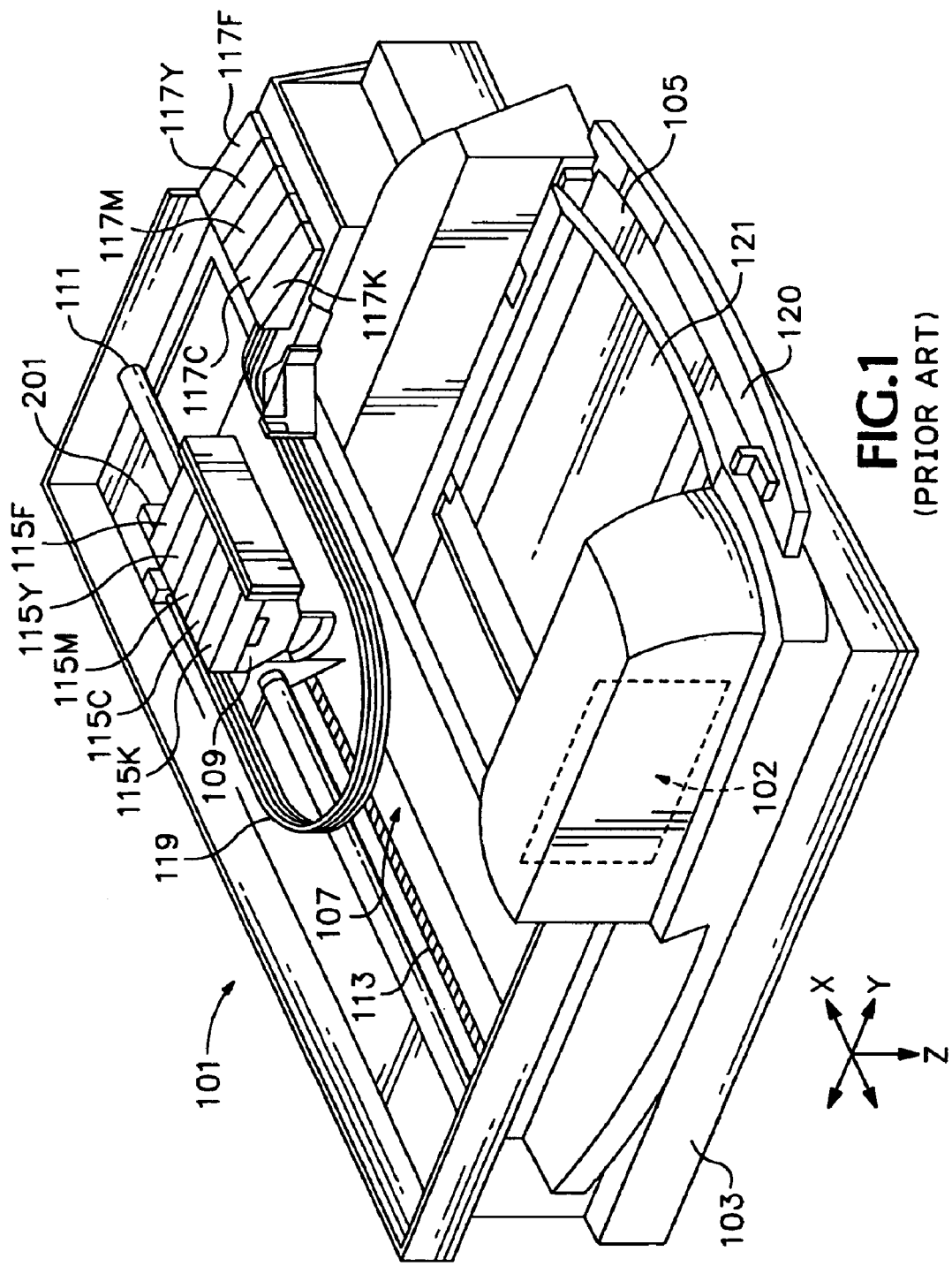
FIG. 1 (Prior Art) is an exemplary ink-jet hard copy apparatus
Figure 2:
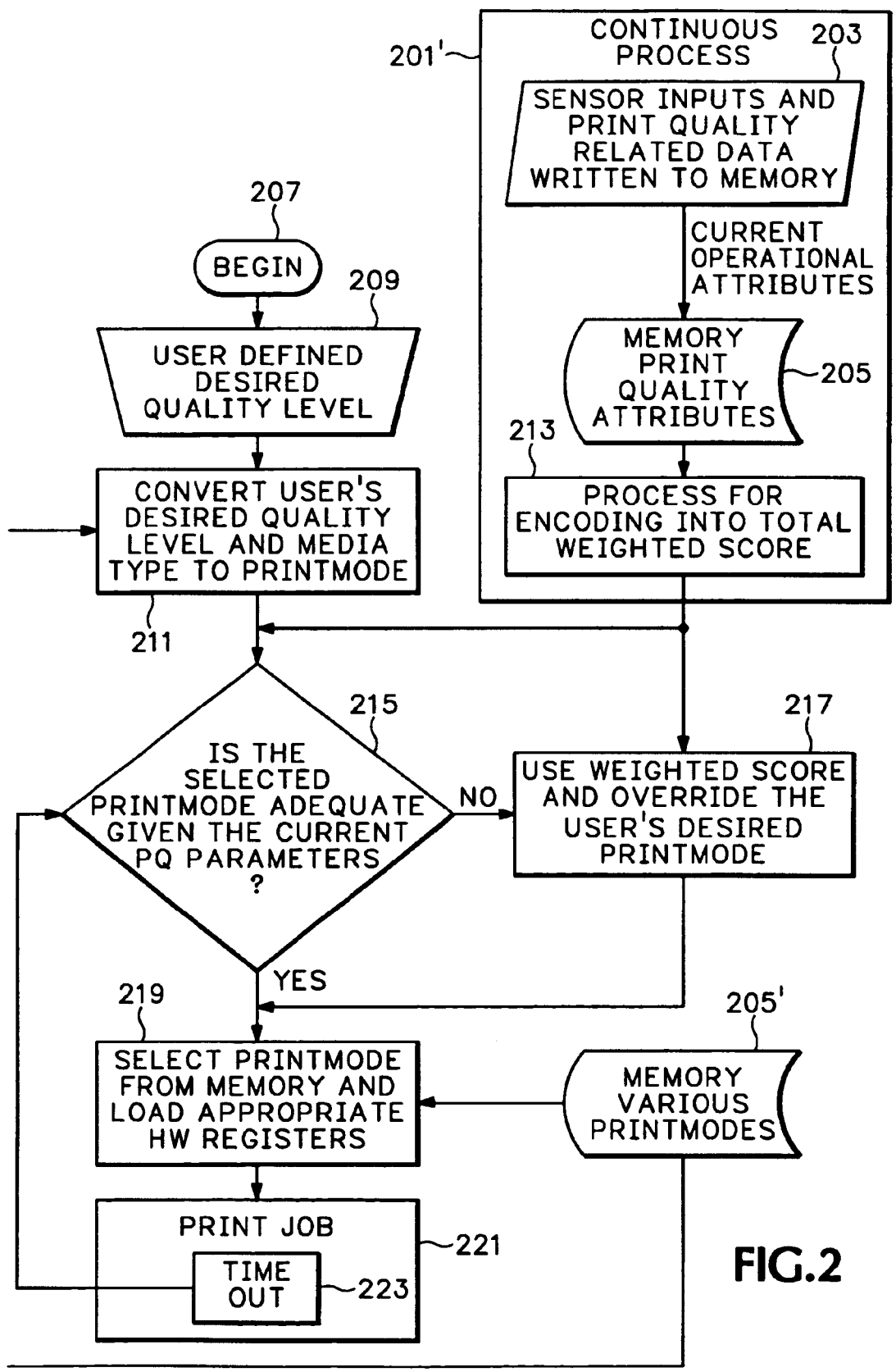
FIG. 2 is a block diagram of a print mode adjustment method and apparatus in accordance with the present invention.

FIG. 2 is a block diagram illustrating the method and apparatus of the present invention as can be incorporated within a hard copy apparatus as shown in FIG. 1; generally, implementation may be via software or firmware routines using commonly known digital signal processing ("DSP") techniques are operated from a microprocessor or ASIC included in the controller 102 subsystem.

Sensors, generally represented by element 201 in FIG. 1, such as those described by Lesniak or Boeller et al., supra, and the like as would be known in the art, provide continuous information gathering 201' for data processing. The sensors provide current operating conditions and print quality data 203. Such data 203 is stored in a memory 205.

At the beginning of a printing cycle, step 207, the end user generally uses the application software running on the computer or control panel selectors of the printer controller 102 (FIG. 1) to select a print quality level 209 based upon the particular job and the particular media 105 being employed in the input tray 120. Commonly, the original equipment manufacturer ("OEM") provides multiple settings for print quality range from a low resolution level, e.g., "DRAFT," where the controller may designate a single pass swath printing cycle at a resolution of about 150 dots-per-inch ("DPI"), to a highest resolution level available, e.g., "PHOTO," where the controller may designate a multipass swath printing cycle at the highest capable resolution, e.g., 1600 DPI. Thus, the user selection 209 is converted to a print mode 211 in accordance with the OEM provision; each print mode is assigned a performance value.

In accordance with the present invention, the collected data 203 is used to develop, step 213, a weighting of current operating attributes of the printer system. This system of weighting and normalizing of the current Operational Attributes (see FIG. 4) is used to evaluate the potential print quality the system is currently capable of producing. The Attributes are combined in such a way that threshold values can be set and various print modes attached to those threshold values.

FIG. 3 is an exemplary embodiment illustrating the developing of a current operational condition weighted score that can be used to dynamically determine print mode. Several of the available known Operational Attributes have been selected as a set to be used in adjusting the print mode; in this example, the first eight Operational Attributes of TABLE 1 (also listed above in the Background section). Each selected attribute is given a predetermined scale rating its current condition. It will be recognized by those skilled in the art that the selected set of Operational Attributes upon which the weighted scored representative of current operational condition is derived can be tailored to any specific implementation. For example, a particular printer may be known to have significant "Pen-to-Paper spacing (media thickness)" (FIG. 4) usage, making that a significant Operational Attribute for that particular printer.

Looking now again to FIG. 3, each Attribute is assigned a predetermined, scaled value; in this embodiment a "10-Point Scale" is used. For example, Attribute 1 is defined as non-firing nozzles. If no NOZZLE(S) OUT are detected by the sensor, Attribute 1 is given a perfect score of ten; one nozzle missing is given a score of eight; two nozzles missing, a score of six; three nozzles missing, a score of four; four nozzles missing, a score of two; and five or more nozzles missing, a score of zero. MISDIRECTED NOZZLES, Attribute 3, and weak (low drop volume) nozzles, Attribute 4, can be similarly rated. Attribute 2 is defined as LINE FEED ADVANCE errors, which can be detected in very small increments; thus, the rating score may range from a ten for no error to a score of zero for an offsets greater than or equal to ±2.0 mils. ALIGNMENT errors, Attribute 5, and THETA-Z errors, Attribute 6, can be similarly rated. Attribute 7, DROP WEIGHT, can be measured and ranked as a percentage decrease. DOT SHAPE, Attribute 8, can be detected and give a score based on subjective comparisons—to stored criteria—"Poor" shape, "Moderate" distortion from intended shape, or "Good" shape and relative points assigned. It should be recognized that some scores are directly correlated while others are inversely correlated; for example, under Attribute 1, when no nozzles are out, a high score is assigned because print quality will be good based on this Attribute alone, while in Attribute 2, when the line feed error is high, print quality will be adversely affected, so a low score is assigned.

During printing, the sensor inputs and print quality related data 203 are converted in real time to a total weighted score 213. Assume for the present example that current printer operating conditions provided by sensor data are shown in FIG. 3 by the circled selected values in each of the columns for the Operational Attributes 1.–8. A "Performance Score" 301 for each Attribute is weighted subjectively; in other words, the OEM may determine that for the selected set of eight Operational Attributes, some are more important than others and has assigned appropriate Subjective Weighting factors 302. For example, Attribute 1., NOZZLE MISSING is critical so it is given a weighting of 100, but Attribute 8. DOT SHAPE is of a less critical nature so it is given a weighting of only 25. A "Weighted Score" 303 for each Attribute 1.–8. is derived.

The "Total Weighted Score" 304 ("TWS") is then defined as:

$$TWS = WS_{1-n} \div n \qquad \text{(Equation 1)},$$

where "n"=number of Attributes, and
where the "Weighted Score" ("WS") 303 is defined as:

$$WS = PS_{MAX} - (SW\% \, (PS_{MAX} - PS)) \qquad \text{(Equation 2)},$$

where PS is the "performance score" 301 and SW % is the "subjective weighting" 302.

In general, various Attributes (see FIG. 4) can be combined in such a way that threshold values can be created subjectively or empirically and various print modes attached to those threshold values. For example, the OEM may choose a one-pass print mode for print quality thresholds above 9, a two-pass mode for thresholds between 5 and 9 and a four-pass mode for thresholds below 5; these print modes are also stored in a memory 205'. The normalizing the data 203, 205 and applying the rating scale to develop a real time attribute score can then be compared, step 215, FIG. 2, to the thresholds so set by the OEM. In the present example of FIG. 3, the real time score is 8.9. Thus, if the user had selected 209 a one-pass print mode to obtain a particular print quality assigned, the real time score at 8.9 shows that the current printer performance can not achieve that print quality in one pass. The printer automatically overrides the user selection 209, step 217 (215 No-path). The appropriate print mode is selected and loaded in the appropriate registers of the controller 102 (FIG. 1), step 219. Printing, step 221, is then initiated. The whole job can be printed until the end of the job data 207, or a periodic check subroutine 223, such as a known manner timer, can be used at any points to re-compare the current Weighted Score to the threshold. For example, nozzles that had not been firing may clear and start firing, raising the substantially instantaneous Weighted Score to above 9; the printer would automatically switch to the one-pass mode initially selected by the user in the example, speeding throughput for the remainder of the job.

It will be recognized by those skilled in the art that Operational Attributes may interact with each other and that the process should be designed to handle those known interactions. A particular set of selected attributes can cause the print quality to degrade even though all of the individual attributes have not passed their threshold values.

In summary, the present invention uses various real-time monitoring and resultant data inputs to change the print mode, dynamically during print cycles. Note that as a result of real-time monitoring and print mode adjustment, predetermined primary default print modes can be set a higher performance level. Various feedback subsystems provide real-time information critical to selecting specific print mode operational parameters, or attributes; The attributes allow the print mode to be fine tuned, dynamically, for each printer and pen combination over the life of the printer. Thresholds that signal a print mode change are defined.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . ."

What is claimed is:

1. A method for determining a print image quality capability indicator of an ink-jet hard copy apparatus based on current actual operational conditions of the apparatus, comprising the steps of:

storing a plurality of predetermined ink-jet printing operation attributes related to output print image quality, the step of storing further comprising determining a set of operational attributes related to print image quality produced by the ink-jet hard copy apparatus, assigning a series of scaled values to each of said operational attributes such that each of the scaled values is representative of a predetermined level of performance of each of the respective operational attributes, and storing a look-up table wherein a correlated scaled value is selected based on the current actual operating conditions;

normalizing each selected scaled value to a common standard;

monitoring during printing a plurality of ink-jet printing operating characteristics corresponding to said operating attributes;

comparing said operating characteristics to said attributes, the step of comparing further comprising selecting for a current operational attribute of the ink-jet hard copy apparatus the scaled value representative of a predetermined level of performance indicative of a current operational condition; and based on comparing said operating characteristics to said attributes, assigning a print image quality capability indicator for each of the operating characteristics representative of current actual operational conditions, the step of assigning further comprising deriving from a summation of each selected scaled value of all the printing attributes the value representative of print image quality availability based on the current actual operational conditions of the hard copy apparatus.

2. A computerized method for selecting a print mode for an ink-jet hard copy apparatus, comprising the steps of:

storing a set of data indicative of ink-jet printing operational attributes related to output print image quality;

monitoring during printing print image quality related ink-jet printing characteristics;

comparing each of said characteristics to selected operational attributes and deriving a comparison value for each of said characteristics indicative of current operational functionality of the apparatus;

calculating a function value representative of expected print image quality during a next subsequent printing operation as a function of all derived comparison values for each of said characteristics;

comparing said function value to a correlated preselected print image quality value indicative of a predetermined print quality output; and selecting the print mode for the next subsequent printing operation based on said comparing aid function value to said correlated preselected print image quality value indicative of a predetermined print image quality output.

3. The method as set forth in claim 2, the step of storing a set of data indicative of ink-jet printing operational attributes further comprising:

selecting ink-jet printing operational attributes significantly affecting print image quality by the hard copy apparatus, and assigning a set of weighted values to each of said operational attributes such that one of said weighted values can be selected as an indication of a current operational condition of the hard copy apparatus as determined by said step of monitoring print image quality related ink-jet printing characteristics during printing operations.

4. The method as set forth in claim 3, the step of selecting the print mode for the next subsequent printing operation based on said comparing said function value to said correlated preselected print image quality value indicative of a predetermined print image quality output further comprising:

if said preselected print image quality value assigns a print mode having a faster throughput than a print mode based on said function value, and if said hard copy apparatus is capable of print with a print image quality at least equal to the print image quality related to said preselected print image quality value, printing in the print mode related to said preselected print image quality value, or if said print mode related to said preselected print image quality value can not achieve the print image quality preselected as determined by said step of comparing said function value to a correlated preselected print image quality value indicative of a predetermined print image quality output, over-riding selection of the print mode related to said preselected print image quality value and printing in the print mode based on said function value.

5. A method for selecting a print mode for an ink-jet hard copy apparatus having a plurality of user selected print modes for rendering a plurality of print image quality levels, comprising the steps of:

A) storing a set of ink-jet printing operational attributes;

B) monitoring during printing print image quality related ink-jet printing characteristics;

C) comparing said characteristics to said operational attributes for deriving a comparison value representative of expected print image quality during a next subsequent printing operation;

D) assigning a currently available print mode to said comparison value;

E) comparing said currently available print mode to a user currently selected print mode; and F) over-riding said currently selected print mode by selecting said currently available print mode when said currently selected print mode is insufficient to render an expected print image quality level from the currently selected print mode of the plurality of user selected print modes.

6. The method as set forth in claim 5, comprising the steps of:

G) starting a printing job in a currently used print mode comprising the currently selected print mode or the currently available print mode as determined in steps E) and F);

H) periodically halting said printing job; and

I) repeating steps B) through H) until said printing job is finished.

7. The method as set forth in claim 5, the step of storing a set of ink-jet printing operational attributes further comprising:

storing a data set for a plurality, "n," of operational attributes wherein a performance score is provided in a predetermined relationship to a series of performance levels of operation for each of the attributes such that the score is indicative of the related attribute positive or negative affect on print image quality.

8. The method as set forth in claim 7, the step of comparing said characteristics to said operational attributes for deriving a comparison value representative of expected print image quality during a next subsequent printing operation further comprising:

from said data set, each said comparison value is determined as a function of a weighted score, "WS," for each of the plurality of operational attributes, and where $$WS = PS_{MAX} - (SW\% \, (PS_{MAX} - PS)),$$

where PS is an operational attributes performance score and SW % is predetermined subjective weighting factor.

9. The method as set forth in claim 8, further comprising the step of:

determining a total weighted score, "TWS," indicative of said currently available print mode in accordance with the equation:

$$TWS = WS_{1-n} \div n.$$

10. A system for dynamic print mode selection in an ink-jet hard copy apparatus having a plurality of end-user selectable print image quality levels, comprising:

sensor means for monitoring during printing print quality related ink-jet printing characteristics;

coupled to said sensor means, memory means for storing data output from said sensor means and for containing predetermined print mode operational instructions related to print quality; and processing means for encoding the data output from said sensor means as a value representative of current operational print image quality availability and for comparing current operational print image quality availability to desired print image quality based on a currently selected one of the end-user selectable print image quality levels and for overriding the current end-user selectable print image quality level for the next printing operation and substituting a print mode representative of achieving the current end-user selectable print image quality level from said predetermined print quality related ink-jet printing characteristics print image quality related ink-jet printing characteristics mode operational instructions when said current operational print image quality availability is not adequate to meet the print image quality level of the current end-user selectable print image quality level.

11. The system as set forth in claim 10, the processing means further comprising:

means for halting a printing operation periodically to re-evaluate said current operational print image quality availability and for re-comparing current operational print image quality availability to desired print image quality based on a currently selected one of the end-user selectable print image quality levels and for restarting the printing operation in a print mode suited to any changes in current operational print image quality availability based on current said print image quality related ink-jet printing characteristics.

* * * * *